United States Patent Office 3,244,718
Patented Apr. 5, 1966

3,244,718
PIPERAZINE DERIVATIVES
John Hans Biel, 4444 N. Murray Ave., Milwaukee, Wis.
No Drawing. Filed Feb. 17, 1964, Ser. No. 345,122
13 Claims. (Cl. 260—268)

This invention relates to certain novel compounds exhibiting potent activity as antihistaminic, as antiserotonin and especially as antiallergic agents and, more particularly, relates to a series of compounds described precisely below which may be referred to very generally for purposes of brevity as 1-(benzhydryl-type)-4-[N-substituted-$\beta$-carboxamidoethyl]piperazines and homopiperazines and their nontoxic, pharmaceutically acceptable acid additions salts.

It was the object of the present invention to provide novel and potent antiallergic agents.

The object of the present invention has been achieved by the provision, according to the present invention, of a group of compounds of the formula

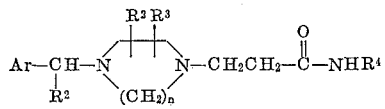

wherein Ar–represents

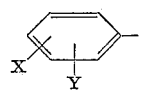

in which X and Y each represent hydrogen, chloro, bromo, fluoro, iodo, trifluoromethyl, (lower)alkyl, (lower)alkoxy, (lower)alkyl thio, (lower)alkanoylamino, phenyl phenoxy, nitro or, when taken together, methylenedioxy, $R^1$ is phenyl, naphthyl, cycloalkyl containing from three to seven carbon atoms inclusive, e.g. cyclopropyl, cyclobutyl, cyclophenyl, cyclohexyl, cycloheptyl, cycloalkenyl containing from five to seven carbon atoms, inclusive, e.g. cyclopentenyl, cyclohexenyl, cycloheptenyl, thienyl or pyridyl, $R^2$ and $R^3$ are each hydrogen or methyl, $n$ is the integer 2 or 3 and $R^4$ is naphthyl, thienyl, pyridyl, oxazolyl, thiazolyl, propargyl, 2 - phenylcyclopropyl, —Ar or -alk—Ar in which alk represents a bivalent saturated alkylene group containing one, two or three carbon atoms, e.g. $CH_2$—, —$CH_2CH_2$, —$CH(CH_3)CH$.— or

—$CH_2CH(CH_3)$—, and —Ar is as defined above; and nontoxic, pharmaceutically acceptable salts thereof.

The term "(lower)alkyl" as used herein means both straight and branched chain monovalent aliphatic hydrocarbon radicals having from one to six carbon atoms, inclusive, such as methyl, ethyl, propyl, isopropyl, n-butyl, isobutyl, tert.-butyl, sec.-butyl, n-amyl, isoamyl and the like.

The compounds of the present invention include the free bases and the nontoxic, pharmaceutically acceptable acid addition salts with inorganic and organic acids which are prepared by the simple addition of one or two equivalents of acid to the base. These salts include those prepared from acids such as hydrochloric, sulfuric, sulfamic, tartaric, hydrobromic, hydriodic, glycolic, citric, maleic, phosphoric, succinic, acetic, ascorbic and the like. Many of the acid addition salts of these compounds exhibit usefully increased solubility in water.

Four more limited preferred embodiments of the present invention are the four groups of compounds of the formulae

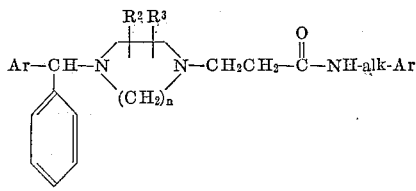

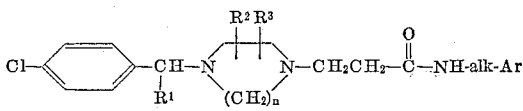

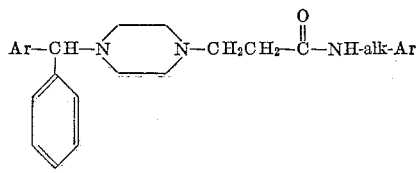

and

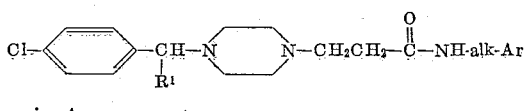

wherein Ar represents

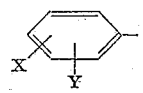

in which X and Y each represent hydrogen, chloro, bromo, iodo, fluoro, trifluoromethyl, (lower)alkyl, (lower)alkoxy, (lower)alkylthio, (lower)alkanoylamino, phenyl phenoxy, nitro or when taken together, methylenedioxy, $R^1$ represents phenyl, naphthyl, cycloalkyl containing from three to seven carbon atoms, inclusive, cycloalkenyl containing from five to seven carbon atoms inclusive, thienyl or pyridyl, $R^2$ and $R^3$ represent hydrogen or methyl, $n$ is an integer from two to three inclusive and alk represents a bivalent saturated alkylene group containing from one to three carbon atoms inclusive; and the nontoxic, pharmaceutically acceptable salts thereof.

Another preferred embodiment of the present invention is the group of compounds of the formula

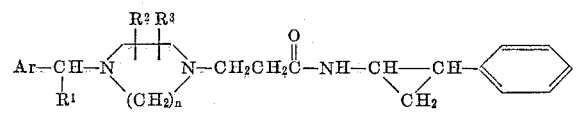

wherein $R^1$ represents phenyl, naphthyl, cycloalkyl containing from three to seven carbon atoms, inclusive, cycloalkenyl containing from five to seven carbon atoms inclusive, thienyl or pyridyl, $R^2$ and $R^3$ represent hydrogen or methyl, $n$ is an integer from two to three inclusive; and the nontoxic, pharmaceutically acceptable salts thereof.

Individual preferred embodiments of the present invention are the free bases and nontoxic, pharmaceutically acceptable acid addition salts of the compounds having the formulae

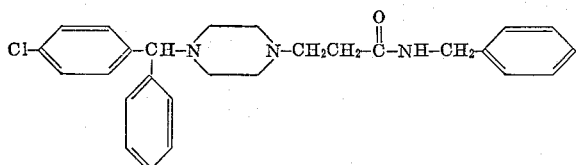

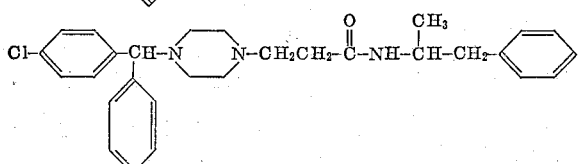

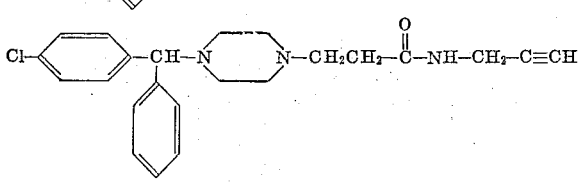

and

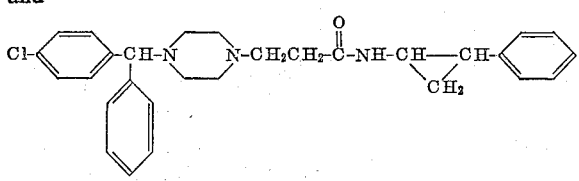

Tests of the compounds of the present invention for anti-allergic activity were carried out using a standard anti-anaphylaxis test in which animals were sensitized to antigenic material and later challenged intravenously with the same antigen to produce an anaphylactic reaction which kills a high percentage of the anicals by a hypersensitivity reaction. Prevention of such deaths by prior administration of a test compound provides evidence that the compound is an anti-allergic and anti-anaphylactic agent.

The preferred compound of the present invention, 1-(p-chlorobenzhydryl) - 4 - (N - benzyl)-β-carboxamido-ethylpiperazine dimaleate, in this test gave zero deaths when given to groups of three animals in doses ranging from 200 mgm./kg. down to, and including, 6.25 mgm./kg. and was thus found to be a potent antiallergic agent.

The compounds of the present invention also exhibit antihistaminic and antiserotonin activity in vitro and in vivo. In addition, these basic compounds can be used to recover and purify penicillins, with which they form salts.

The intermediate and final compounds of the present invention are made according to the following reaction schemes:

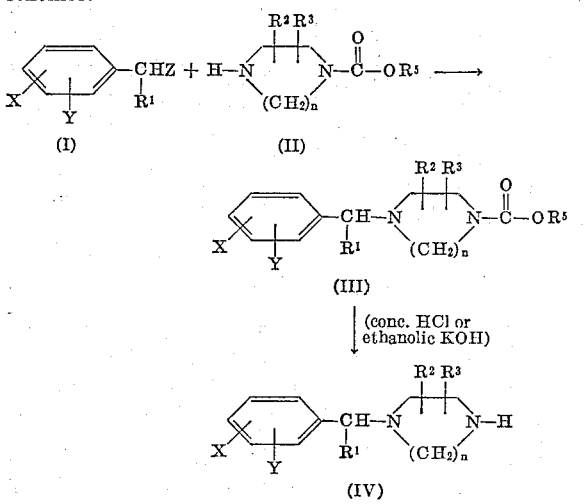

in which X, Y, $R^1$, $R^2$ and $n$ have the meaning set forth above, Z is bromo or chloro or iodo and $R^5$ represents (lower)alkyl.

These reagents and those set forth below are in many cases available commercially or can be prepared by the methods reported in the literature for identical or similar compounds. Thus, benzhydryl halides and the other halides of Formula I can be easily prepared from the corresponding alcohol which in turn is made in the usual fashion by the reaction of a Grignard reagent with an aldehyde and are prepared, for example, according to U.S. Patents 2,861,072 and 2,899,436 and to J. Amer. Chem. Soc., 71, 2731–2736 (1949) and J. Org. Chem., 14, 775–782 (1949) and to Morren et al., Bull. Soc. Chim. Belg., 60, 282–295 (1951). The N-carbalkoxy-piperazines and homopiperazines and their mono- and di-methyl-substituted derivatives are described, for example, in U.S. Patent 2,636,032, in J. Org. Chem. 18, 1478–1488 (1953) and in British Patent 769,117.

Compounds of type III are disclosed, for example, in U.S. Patents 2,818,269 and 2,861,072, in J. Org. Chem. 24. 459–463 (1959), in J. Amer. Chem. Soc. 71, 2731–2736 (1949), in Bull. Soc. Chim. Belg., 60, 282–295 (1951), in Belgian Patent 539,693 and in British Patents 769,117 and 752,332.

Compounds of type IV are disclosed for example, in U.S. Patents 2,861,072 and 2,819,269, in J. Amer. Chem. Soc. 71, 2731–2736 (1949), in Bull. Soc. Chim. Belg. 60, 282–295 (1951), in Belgian Patent 544,751 and in British Patents 738,690, 817,231, 769,117, 752,332 and 705,979.

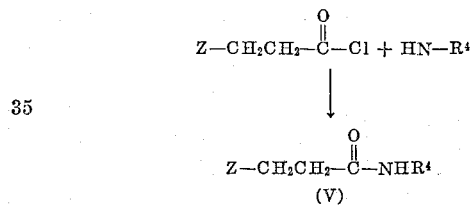

in which Y and $R^4$ have the meaning set forth above and Z is an active alkylating moiety such as chloro, bromo, iodo or tosyl. Thus the β-substituted propionamides, e.g. β-chloropropionamides, of Formula V are prepared by the reaction shown above or, for example as reported in U.S. Patents 3,029,241 and 2,580,411.

The compounds of the present invention are then prepared by the reaction

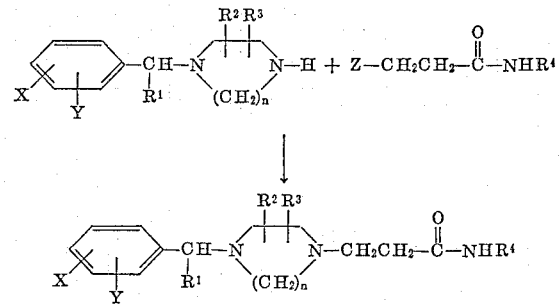

in which X, Y, $R^1$, $R^2$, $R^3$, $n$, Y, Z and $R^4$ have the meaning set forth above.

The reactants, preferably in about equimolar amounts, are brought together in an unreactive medium, e.g. an organic solvent such as dimethylformamide, toluene, xylene, dimethoxyethane or diethyleneglycol and heated, e.g. at 50–100° C., the complete the reaction, e.g. for several hours, and preferably in the presence of an acid acceptor such as potassium carbonate or a hydrocarbonylamine, e.g., triethylamine, aminopyrine, diethylaniline. The basis amide so-produced is then recovered, e.g. by collection as by filtration after precipitation as an oil or crytalline solid, especially upon cooling or removal of solvent, or by extraction into a solvent such as methylene chloride, chloroform or carbon tetrachloride followed by solvent removal.

The free base may be converted to a nontoxic, pharmaceutically acceptable acid addition salt by simple addition of one, or preferably two, equivalents of acid.

Some of the α-substituted benzylpiperazines which are used in this process are:

1-benzhydrylpiperazine,
1-benzhydrylhomopiperazine,
1-p-chlorobenzhydrylpiperazine,
1-p-chlorobenzhydryl-2,5-dimethylpiperazine,
1-p-trifluoromethylbenzhydrylhomopiperazine,
1-m-bromobenzhydrylpiperazine,
1-o-methoxybenzhydrylpiperazine,
1-(α-cyclopentyl)benzylpiperazine,
1-(α-1-naphthyl)benzylpiperazine,
1-(α-2-thienyl)benzylpiperazine,
1-(α-cyclohexenyl)benzylpiperazine,
1-(α-cyclopropyl)benzylpiperazine,
1-(α-2-pyridyl)benzylpiperazine,
1-benzhydryl-3-methylpiperazine,
1-benzhydryl-3′,5′-dimethylpiperazine,
1-(α-4′-fluorophenyl)-m-trifluorobenzylpiperazine,
1-(α-3′,4′-methylenedioxyphenyl)-p-chlorobenzylpiperazine,
1-m-fluorobenzhydrylhomopiperazine.

Some of the β-halo- or β-tosyl-N-substituted propionic acid amides which are used in this process are:

N-benzyl-β-chloropropionamide,
N-benyl-β-tosylpropionamide,
N-benzyl-β-bromopropionamide,
N-β-naphthyl-β-bromopropionamide,
N-o-tolyl-β-bromopropionamide,
N-p-trifluoromethylbenzyl-β-bromopropionamide,
N-o-methoxybenzyl-β-bromopropionamide,
N-thienyl-β-chloropropionamide,
N-2-pyridyl-β-chloropropionamide,
N-β-phenethyl-β-chloropropionamide,
N-3-pyridyl-β-chloropropionamide,
N-2-thiazolyl-β-chloropropionamide,
N-2-oxazolyl-β-chloropropionamide,
N-2-phenylcyclopropyl-β-chloropropionamide,
N-phenyl-β-chloropropionamide,
N-2,6-dimethylphenyl-β-chloropropionamide,
N-α-methylphenethyl-β-chloropropionamide.

Thus, each of the above amides is reacted in turn with each of the piperazines listed above to produce a compound of the present invention.

Some representative products obtained by the process of the present invention are:

1-p-chlorobenzhydryl-4-(N-benzyl-β - carboxamidoethyl)piperazine,
1-(m-chlorobenzhydryl)-4-(N-β-naphthyl - β - carboxamidoethyl)piperazine,
1-m-trifluoromethylbenzhydryl-4-(N-p - fluorobenzyl - β-carboxamidoethyl)piperazine,
1-o-bromobenzhydryl-4-(N-3′,4′ - methylenedioxybenzyl-β-carboxamidoethyl)piperazine,
1-benzhydryl-4-(N-α - naphthyl - β - carboxamidoethyl) piperazine,
1-p-chlorobenzhydryl-4-(N-β-phenethyl-β - carboxamidoethyl)piperazine,
1-o-methoxybenzhydryl-4-(N-2-thienyl-β - carboxamidoethyl)piperazine,
1-[α-(2-thienyl)benzyl]-4-(N-p-trifluoromethylbenzyl - β-carboxamidoethyl)piperazine,
1-[α-(cyclopentyl)benzyl]-4-(N-phenyl-β - carboxamidoethyl)piperazine,
1-[α-(cyclohexenyl)benzyl]-4-(3′,4′-dimethoxybenzyl - β-carboxamidoethyl)piperazine,
1-[α-(2-pyridyl)benzyl]-4-(N-β - phenylcyclopropyl - β-carboxamidoethyl)piperazine,
1-[α-(cyclopropyl)benzyl]-4-(N-2′,6′-dimethylphenyl - β-carboxamidoethyl)piperazine,
1-p-chlorobenzhydryl-4-(N-p-phenoxybenzyl-β - carboxamidoethyl)piperazine,
1-p-chlorobenzhydryl-4-(N-benzyl-β - carboxamidoethyl)homopiperazine,
1-[α-(4′-fluorophenyl)-m-trifluoromethylbenzyl]-4 - (N-p-chlorobenzyl-β-carboxamidoethyl)piperazine,
1-[α-(3′,4′-methylenedioxyphenyl)benzyl]-4-(N-o - tolyl-β-carboxamidoethyl)piperazine,
1-[α-(m-ethylmercaptophenyl)benzyl]-4-(N-2′ - pyridyl-β-carboxamidoethyl)piperazine,
1-m-fluorobenzhydryl-4-(N-4 - nitrobenzyl - β - carboxamidoethyl)homopiperazine,
1-p-chlorobenzhydryl-4-(N-2-oxazoyl - β - carboxamidoethyl)piperazine,
1-p-chlorobenzhydryl-4-(N-β-phenethyl-β - carboxamidoethyl)homopiperazine,
1-p-chlorobenzhydryl-4-(N-p-methylthiobenzyl - β - carboxamidoethyl)piperazine,
1-p-chlorobenzhydryl-4-(N-p-acetamidobenzyl-β - carboxamidoethyl)piperazine,
1-p-chlorobenzhydryl-4-(N-p - acetamidobenzylallyl - β-carboxamidoethyl)homopiperazine)
1-p-chlorobenzhydryl-4-(N-benzyl-β - carboxamidoethyl)-2,5-dimethylpiperazine,
1-p-trifluoromethylbenzhydryl-4-(N-benzyl - β - carboxamidoethyl)piperazine,
1-p-chlorobenzhydryl-4-(N-benzyl-β - carboxamidoethyl)-3-methylpiperazine.

The compounds may be prepared and used as the free bases or in the form of their nontoxic acid addition salts. Typical acids which may be used include hydrochloric, sulfuric, citric, tartaric, fumaric, maleic, succinic, cyclohexylsulfamic, benzoic and methanesulfonic acid.

The following examples will serve to illustrate, without limiting, the preparation of specific compounds within the scope of this invention. All temperatures are given in degrees centigrade.

EXAMPLE 1

*1-(p-chlorobenzhydryl)-4-(N-benzyl-β-carboxamidoethyl)piperazine*

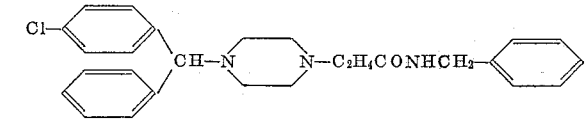

A mixture of 1-(p-chlorobenzhydryl)piperazine (11.4 g., 0.04 M), N-benzyl-3-chloropropionamide (7.85 g., 0.04 M), triethylamine (0.06 M) and dimethyl formamide (20 M) was heated to 70° for 4.5 hr. with stirring. When cool the mixture was poured into dilute sodium hydroxide. The oily product which separated did not solidify. The aqueous portion was therefore decanted and the residue taken up in methylene chloride. The methylene chloride was removed by distillation in vacuo and the crude product thus obtained as its base was converted to its acid addition salt.

EXAMPLE 2

*1-(p-chlorobenzhydryl)-4-(N-benzyl-β-carboxamidoethyl)piperazine dimaleate*

The crude base of Example 1 was dissolved in isopropyl alcohol and converted to its dimaleate salt by the addition of an isopropyl alcohol solution of maleic acid. After recrystallization of the product from isopropyl alcohol it melted at 173.5–174.5°.

*Analysis.*—Calcd. for $C_{31}H_{34}N_3ClO_5$: C, 66.00; H, 6.08; N, 7.45; Cl, 6.29. Found: C, 66.34; H, 6.11; N, 7.28; Cl, 6.31.

EXAMPLE 3

*1-(p-chlorobenzhydryl)-4-(N-α-methyl-β'-phenethyl)-β-carboxamidoethylpiperazine*

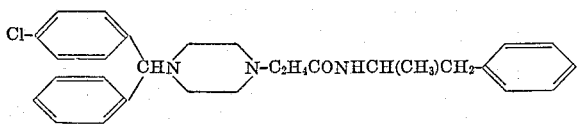

A mixture of 1-(p-chlorobenzhydryl)piperazine (15 g., 0.05 M), N-α-methylphenethyl β-chloropropionamide (11.8 g., 0.05 M), triethylamine (8 ml., 0.06 M) and dimethyl formamide (30 ml.) was heated to 85° for 5 hours with stirring. When cool, the mixture was poured into dilute sodium hydroxide. The oily product which separated did not solidify. The aqueous portion was decanted and the residue dissolved in ether. After the ethereal solution was dried over anhydrous potassium carbonate, the crude product was converted directly to its acid addition salt.

EXAMPLE 4

*1-(p-chlorobenzhydryl)-4-(N-α-methyl-β'-phenethyl)-β-carboxamidoethylpiperazine dimaleate*

The ethereal solution of Example 3 was treated with alcoholic maleic acid to form the dimaleate salt. After crystallization of the product from isopropanol it melted at 124–126°.

Analysis.—Calcd. for $C_{37}H_{42}N_3O_9Cl$: C, 62.75; H, 5.98; N, 5.93; Cl, 5.00. Found: C, 62.32; H, 6.18; N, 5.84; Cl, 5.00.

EXAMPLE 5

*1-(p-chlorobenzhydryl)-4-(N-β-phenylcyclopropyl-β-carboxamidoethyl)piperazine*

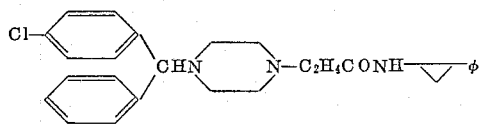

A mixture of 1-(p-chlorobenzhydryl)piperazine (15 g., 0.052 M), N-(trans-2-phenylcyclopropyl)-3-chloropropionamide, triethylamine (8 ml., 0.06 M) and dimethyl formamide (30 ml.) was heated to 85° for five hours with stirring. When cool, the mixture was poured into dilute sodium hydroxide. The oily product which separated did not solidify. The aqueous portion was decanted and the residue dissolved in ether and the resulting solution dried over anhydrous potassium carbonate. The ethereal solution of the base was converted directly to the acid addition salt.

EXAMPLE 6

*1-(p-chlorobenzhydryl)-4-(N-β-phenylcyclopropyl-β-carboxamidoethyl)piperazine dimaleate*

The ethereal solution of Experiment 5 was treated with alcoholic maleic acid. The crude dimaleate salt was recrystallized from isopropanol. The pure product melted at 140–153°.

Analysis.—Calcd. for $C_{37}H_{40}N_3O_9Cl$: C, 62.96; H, 5.72; N, 5.95; Cl, 5.02. Found: C, 63.04; H, 5.81; N, 5.77; Cl, 5.16.

EXAMPLE 7

*1-[α-(cyclopentyl)benzyl]-4-(N-p-trifluoromethylbenzyl-β-carboxamidoethyl)piperazine*

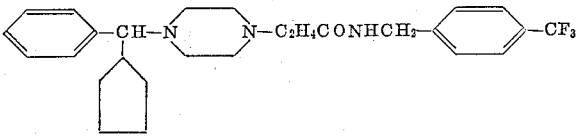

This compound is prepared from 1-(α-cyclopentylbenzyl)piperazine and N-p-trifluorobenzyl-β-cholorpropionamide according to the directions outlined under Example 1.

EXAMPLE 8

*1-[α-(2'-pyridyl)benzyl]-4-(N-phenyl-β carboxamidoethyl)piperazine*

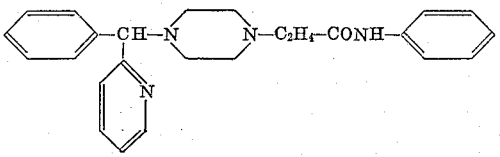

This compound is prepared from 1-[α-(2-pyridyl)-benzyl]-piperazine and N-phenyl-β-cholorpropionamide according to the directions outlined under Example 1.

EXAMPLE 9

*1-p-trifluoromethylbenzhydryl-4-(N-2'-pyridyl-β-carboxamidoethyl)piperazine*

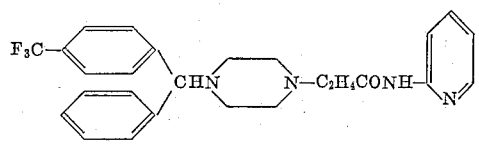

This compound is prepared from 1-p-trifluoromethyl-benzhydrylpiperazine and N-2'-pyridyl-β-chloropropionamide according to the directions outlined under Example 1.

EXAMPLE 10

*1-p-chlorobenzhydryl-4-(N-benzyl-β carboxamidoethyl)homopiperazine*

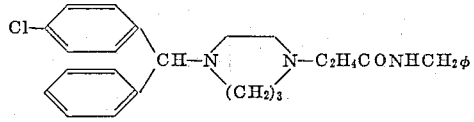

This compound is prepared from 1-p-chlorobenzhydryl-homopiperazine and N-benzyl-β-chloropropionamide according to the directions outlined under Example 1.

EXAMPLE 11

*1-p-chlorobenzhydryl-4-(N-γ-phenylpropyl-β-carboxamidoethyl)homopiperazine*

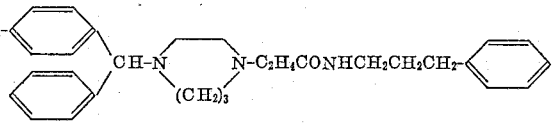

This compound is prepared from chlorbenzhydryl-homopiperazine and N-γ-phenylpropyl-β-chloropropionamide according to the directions outlined under Example 1.

EXAMPLE 12

Substitution in the procedure of Example 1 for the N-benzyl-3-chloropropionamide used therein of 0.04 mole of N-α-naphthyl-3-chloropropionamide,
N-β-naphthyl-3-chloropropionamide,
N-2'-thienyl-3-chloropropionamide,
N-4'-pyridyl-3-chloropropionamide,
N-phenyl-3-chloropropionamide,
N-o-chlorophenyl-3-chloropropionamide,
N-m-bromophenyl-3-chloropropionamide,
N-p-iodophenyl-3-chloropropionamide,
N-p-fluorophenyl-3-chloropropionamide,
N-m-trifluoromethylphenyl-3-chloropropionamide,
N-o-tolyl-3-chloropropionamide,
N-m,p-dimethoxyphenyl-3-chloropropionamide,
N-p-methylthiophenyl-3-chloropropionamide,
N-m-acetamidophenyl-3-chloropropionamide,
N-p-biphenylyl-3-chloropropionamide,
N-o-phenoxyphenyl-3-chloropropionamide,
N-p-nitrophenyl-3-chloropropionamide,
N-m,p-methylenedioxyphenyl-3-chloropropionamide, N-o-chlorobenzyl-3-chloropropionamide,
N-m-bromobenzyl-3-chloropropionamide,
N-p-iodobenzyl-3-chloropropionamide,
N-p-fluorobenzyl-3-chloropropionamide,
N-m-trifluoromethylbenzyl-3-chloropropionamide,
N-o-methylbenzyl-3-chloropropionamide,
N-m,p-dimethoxybenzyl-3-chloropropionamide,
N-p-methylthiobenzyl-3-chloropropionamide,
N-m-acetamidobenzyl-3-chloropropionamide,
N-p-phenylbenzyl-3-chloropropionamide,
N-o-phenoxybenzyl-3-chloropropionamide,
N-p-nitrobenzyl-3-chloropropionamide,
N-m,p-methylenedioxybenzyl-3-chloropropionamide,
N-3-pyridyl-3-chloropropionamide,
N-2-thiazolyl-3-chloropropionamide and
N-2-oxazolyl-3 - chloropropionamide, respectively, produces 1-(p-chlorobenzhydryl)-4 - (N-α-naphthyl-β-carboxamidoethyl)piperazine,
1-(p-chlorobenzhydryl)-4 - (N-β-naphthyl-β-carboxamidoethyl)piperazine,
1-(p-chlorobenzhydryl) - 4 - (N-2'-thienyl-β-carboxamidoethyl)piperazine,
1-(p-chlorobenzhydryl) - 4 - (N-4'-pyridyl-β-carboxamidoethyl)piperazine,
1-(p-chlorobenzhydryl) - 4 - (N-phenyl-β-carboxamidoethyl)piperazine,
1-(p-chlorobenzhydryl)-4-(N-o-chlorophenyl - β-carboxamidoethyl)piperazine,
1-(p-chlorobenzhydryl)-4-(N-m - bromophenyl-β-carboxamidoethyl)piperazine,
1-(p-chlorobenzhydryl)-4 - (N-p-iodophenyl-β-carboxamidoethyl)piperazine,
1-(p-chlorobenzhydryl)-4-(N-p - fluorophenyl-β-carboxamidoethyl)piperazine,
1-(p-chlorobenzhydryl)-4-(N-m - trifluoromethylphenyl-β-carboxamidoethyl)piperazine,
1-(p-chlorobenzhydryl) - 4 - (N-o-tolyl-β-carboxamidoethyl)piperazine,
1-(p-chlorobenzhydryl) - 4 - (N-m,p-dimethoxyphenyl-β-carboxamidoethyl)piperazine,
1-(p-chlorobenzhydryl)-4 - (N-p-methylthiophenyl-β-carboxamidoethyl)-piperazine,
1-(p-chlorobenzhydryl) - 4 - (N-m-acetamidophenyl-β-carboxamidoethyl)piperazine,
1-(p-chlorobenzhydryl)-4-(N-p-biphenylyl-β - carboxamidoethyl)piperazine,
1-(p-chlorobenzhydryl) - 4 - (N-o-phenoxyphenyl-β-carboxamidoethyl)piperazine,
1-(p-chlorobenzhydryl) - 4 - (N-p-nitrophenyl-β-carboxamidoethyl)piperazine,
1-(p-chlorobenzhydryl) - 4 - (N-m,p-methylenedioxyphenyl-β-carboxamidoethyl)piperazine,
1-(p-chlorobenzhydryl) - 4 - (N-o-chlorobenzyl-β-carboxamidoethyl)piperazine,
1-(p-chlorobenzhydryl) - 4 - (N-m-bromobenzyl-β-carboxamidoethyl)piperazine,
1-(p-chlorobenzhydryl) - 4 - (N-p-iodobenzyl-β-carboxamidoethyl)piperazine,
1-(p-chlorobenzhydryl) - 4 - (N-p-fluorobenzyl-β-carboxamidoethyl)piperazine,
1-(p-chlorobenzhydryl) - 4 - (N-m-trifluoromethylbenzyl-β-carboxamidoethyl)piperazine,
1-(p-chlorobenzhydryl)-4 - (N-o-methylbenzyl-β-carboxamidoethyl)-piperazine,
1-(p-chlorobenzhydryl)-4-(N-m,p-dimethoxybenzyl-β-carboxamidoethyl)piperazine,
1-(p-chlorobenzhydryl)-4-(N-p-methylthiobenzyl-β-carboxamidoethyl)piperazine,
1-(p-chlorobenzhydryl)-4-(N-m-acetamidobenzyl-β-carboxamidoethyl)piperazine,
1-(p-chlorobenzhydryl)-4-(N-p-phenylbenzyl-β-carboxamidoethyl)piperazine,
1-(p-chlorobenzhydryl)-4-(N-o-phenoxybenzyl-β-carboxamidoethyl)piperazine,
1-(p-chlorobenzhydryl)-4-(N-p-nitrobenzyl-β-carboxamidoethyl)piperazine,
1-(p-chlorobenzhydryl)-4-(N-m,p-methylenedioxybenzyl-β-carboxamidoethyl)piperazine,
1-(p-chlorobenzhydryl)-4-(N-3'-pyridyl-β-carboxamidoethyl)piperazine,
1-(p-chlorobenzhydryl)-4-(N-2'-thiazolyl-β-carboxamidoethyl)piperazine, and
1-(p-chlorobenzhydryl)-4-(N-2'-oxazolyl-β-carboxamidoethyl)piperazine, respectively, which are isolated in the form of the free bases, converted to their solid, crystalline dimaleates by treatment in a minimum of isopropyl alcohol with two equivalents of maleic acid and found to be effective, nontoxic antiallergic, antihistaminic and antiserotonin agents in animals upon oral administration.

EXAMPLE 13

Substitution in the procedure of Example 1 for the 1-(p-chlorobenzhydryl)piperazine used therein of 0.04 mole of 1-(o-bromobenzhydryl)piperazine,
1-(m-iodobenzhydryl)piperazine,
1-(p-fluorobenzhydryl)piperazine,
1-(o-chlorobenzhydryl)piperazine,
1-(o-trifluoromethylbenzhydry)piperazine,
1-(p-methylbenzhydryl)piperazine,
1-(p-methoxybenzhydryl)piperazine,
1-(m-methylthiobenzhydryl)piperazine,
1-(o-acetamidobenzhydryl)piperazine,
1-(p-phenylbenzhydryl)piperazine,
1-(o-phenoxybenzhydryl)piperazine,
1-(m-nitrobenzhydryl)piperazine,
1-(m,p-methylenedioxybenzhydryl)piperazine,
1-(m-chlorobenzhydryl)piperazine,
1-(p-trifluoromethylbenzhydryl)piperazine,
1-(o,p-dichlorobenzhydryl)piperazine,
1-(m,p-dimethoxybenzhydryl)piperazine,
1-[α-(1'-naphthyl)p-chlorobenzyl]piperazine,
1-[α-(cyclopropyl)p-chlorobenzyl]piperazine,
1-[α-(cyclohexyl)p-chlorobenzyl]piperazine,
1-[α-(cycloheptyl)p-chlorobenzyl]piperazine,
1-[α-(1'-cyclopentenyl)p-chlorobenzyl]piperazine,
1-[α-(1'-cyclohexenyl)p-chlorobenzyl]piperazine,
1-[α-(1'-cycloheptenyl)p-chlorobenzyl]piperazine,
1-[α-(2'-thienyl)p-chlorobenzyl]piperazine,
1-[α-(2'-pyridyl)p-chlorobenzyl]piperazine, respectively, produces 1-(o-bromobenzhydryl)-4-(N-benzyl-β-carboxamidoethyl)piperazine,
1-(m-iodobenzhydryl)-4-(N-benzyl-β-carboxamidoethyl)piperazine,
1-(p-fluorobenzhydryl)-4-(N-benzyl-β-carboxamidoethyl)piperazine,
1-(o-chlorobenzhydryl)-4-(N-benzyl-β-carboxamidoethyl)piperazine,
1-(p-trifluoromethyl)-4-(N-benzyl-β-carboxamidoethyl)piperazine,
1-(p-methylbenzhydryl)-4-(N-benzyl-β-carboxamidoethyl)piperazine,
1-(p-methoxybenzhydryl)-4-(N-benzyl-β-carboxamidoethyl)piperazine,
1-(m-methylthiobenzhydryl)-4-(N-benzyl-β-carboxamidoethyl)piperazine,
1-(o-acetamidobenzhydryl)-4-(N-benzyl-β-carboxamidoethyl)piperazine,
1-(m-nitrobenzhydryl)-4-(N-benzyl-β-carboxamidoethyl)piperazine,
1-(p-phenylbenzyhydryl)-4-(N-benzyl-β-carboxamidoethyl)piperazine,
1-(o-phenoxybenzyhydryl)-4-(N-benzyl-β-carboxamidoethyl)piperazine, 1-(m,p-methylenedioxybenzhydryl)-4-(N-benzyl-β-carboxamidoethyl)piperazine,
1-(m-chlorobenzhydryl)-4-(N-benzyl-β-carboxamidoethyl)piperazine,
1-(p-trifluoromethylbenzhydryl)-4-(N-benzyl-β-carboxamidoethyl)piperazine,
1-(o,p-dichlorobenzhydryl)-4-(N-benzyl-β-carboxamidoethyl)piperazine,
1-(m,p-dimethoxybenzhydryl)-4-(N-benzyl-β-carboxamidoethyl)piperazine,
1-[α-(1'-naphthyl)-p-chlorobenzyl]-4-(N-benzyl-β-carboxamidoethyl)piperazine,
1-[α-(cyclopropyl)-p-chlorobenzyl]-4-(N-benzyl-β-carboxamidoethyl)piperazine,
1-[α-(cyclohexyl)-p-chlorobenzyl]-4-(N-benzyl-β-carboxamidoethyl)piperazine,
1-[α-(cycloheptyl)-p-chlorobenzyl]-4-(N-benzyl-β-carboxamidoethyl)piperazine,
1-[α-(1'-cyclopentenyl)-p-chlorobenzyl]-4-(N-benzyl-β-carboxamidoethyl)piperazine,
1-[α-(1'-cyclohexenyl)-p-chlorobenzyl]-4-(N-benzyl-β-carboxamidoethyl)piperazine,
1-[α-(1'-cycloheptenyl)-p-chlorobenzyl]-4-(N-benzyl-β-carboxamidoethyl)piperazine,
1-[α-(2'-thienyl)-p-chlorobenzyl]-4-(N-benzyl-β-carboxamidoethyl)piperazine, and
1-[α-(2'-pyridyl)-p-chlorobenzyl]-4-(N-benzyl-β-carboxamidoethyl)piperazine, respectively, which are isolated in the form of the free bases, converted to their solid, crystalline dimaleates by treatment in a minimum of isopropyl alcohol with two equivalents of maleic acid and found to be effective nontoxic antiallergic, antihistaminic and antiserotonin agents in animals upon oral administration.

EXAMPLE 14

Substitution in the procedure of Example 1 for the 1-(p-chlorobenzhydryl)piperazine used therein of 0.04 mole of 1-(p-chlorobenzhydryl)homopiperazine, and
N-α-naphthyl-3-chloropropionamide,
N-β-naphthyl-3-chloropropionamide,
N-2'-thienyl-3-chloropropionamide,
N-4'-pyridyl-3-chloropropionamide,
N-phenyl-3-chloropropionamide,
N-o-chlorophenyl-3-chloropropionamide,
N-m-bromophenyl-3-chloropropionamide,
N-p-iodophenyl-3-chloropropionamide,
N-p-fluorophenyl-3-chloropropionamide,
N-m-trifluoromethylphenyl-3-chloropropionamide,
N-o-tolyl-3-chloropropionamide,
N-m,p-dimethoxyphenyl-3-chloropropionamide,
N-p-methylthiophenyl-3-chloropropionamide,
N-m-acetamidophenyl-3-chloropropionamide,
N-p-biphenyl-3-chloropropionamide,
N-o-phenoxyphenyl-3-chloropropionamide,
N-p-nitrophenyl-3-chloropropionamide,
N-m,p-methylenedioxyphenyl-3-chloropropionamide,
N-o-chlorobenzyl-3-chloropropionamide,
N-m-bromobenzyl-3-chloropropionamide,
N-p-iodobenzyl-3-chloropropionamide,
N-p-fluorobenzyl-3-chloropropionamide,
N-m-trifluoromethylbenzyl-3-chloropropionamide,
N-o-methylbenzyl-3-chloropropionamide,
N-m,p-dimethoxybenzyl-3-chloropropionamide,
N-p-methylthiobenzyl-3-chloropropionamide,
N-m-acetamidobenzyl-3-chloropropionamide,
N-p-phenylbenzyl-3-chloropropionamide,
N-o-phenoxybenzyl-3-chloropropionamide,
N-p-nitrobenzyl-3-chloropropionamide,
N-m,p-methylenedioxybenzyl-3-chloropropionamide,
N-3-pyridyl-3-chloropropionamide,
N-2-thiazolyl-3-chloropropionamide and
N-2-oxazolyl-3-chloropropionamide, respectively, produces 1-(p-chlorobenzhydryl)-4-(N-α-naphthyl-β-carboxamidoethyl)homopiperazine,
1-(p-chlorobenzhydryl(-4-(N-β-naphthyl-β-carboxamidoethyl)homopiperazine,
1-(p-chlorobenzhydryl)-4-(N-2'-thienyl-β-carboxamidoethyl)homopiperazine,
1-(p-chlorobenzhydryl)-4-(N-4'-pyridyl-β-carboxamidoethyl)homopiperazine,
1-(p-chlorobenzhydryl)-4-(N-phenyl-β-carboxamidoethyl)homopiperazine,
1-(p-chlorobenzhydryl)-4-(N-o-chlorophenyl-β-carboxamidoethyl)homopiperazine,
1-(p-chlorobenzhydryl)-4-(N-m-bromophenyl-β-carboxamidoethyl)homopiperazine,
1-(p-chlorobenzhydryl)-4-(N-p-iodophenyl-β-carboxamidoethyl)homopiperazine,
1-(p-chlorobenzhydryl)-4-(N-p-fluorophenyl-β-carboxamidoethyl)homopiperazine,
1-(p-chlorobenzhydryl)-4-(N-m-trifluoromethylphenyl-β-carboxamidoethyl)homopiperazine,
1-(p-chlorobenzhydryl)-4-(N-o-tolyl-β-carboxamidoethyl)homopiperazine,
1-(p-chlorobenzhydryl)-4-(N-m,p-dimethyoxyphenyl-β-carboxamidoethyl)homopiperazine,
1-(p-chlorobenzhydryl)-4-(N-p-methylthiophenyl-β-carboxamidoethyl)homopiperazine,
1-(p-chlorobenzhydryl)-4-(N-m-acetamidophenyl-β-carboxamidoethyl)homopiperazine,
1-(p-chlorobenzhydryl)-4-(N-p-biphenylyl-β-carboxamidoethyl)homopiperazine,
1-(p-chlorobenzhydryl)-4-(N-o-phenoxyphenyl-β-carboxamidoethyl)homopiperazine,
1-(p-chlorobenzhydryl)-4-(N-p-nitrophenyl-β-carboxamidoethyl)homopiperazine,
1-(p-chlorobenzhydryl)-4-(N-m,p-methylenedioxyphenyl-β-carboxamidoethyl)homopiperazine,
1-(p-chlorobenzhydryl)-4-(N-o-chlorobenzyl-β-carboxamidoethyl)homopiperazine,
1-(p-chlorobenzhydryl)-4-(N-m-bromobenzyl-β-carboxamidoethyl)homopiperazine,
1-(p-chlorobenzhydryl)-4-(N-p-iodobenzyl-β-carboxamidoethyl)homopiperazine,
1-(p-chlorobenzhydryl)-4-(N-p-fluorobenzyl-β-carboxamidoethyl)homopiperazine,
1-(p-chlorobenzhydryl)-4-(N-m-trifluoromethylbenzyl-β-carboxamidoethyl)homopiperazine,
1-(p-chlorobenzhydryl)-4-(N-o-methylbenzyl-β-carboxamidoethyl)homopiperazine,
1-(p-chlorobenzhydryl)-4-(N-m,p-dimethoxybenzyl-β-carboxamidoethyl)homopiperazine,
1-(p-chlorobenzhydryl)-4-(N-p-methylthiobenzyl-β-carboxamidoethyl)homopiperazine,
1-(p-chlorobenzhydryl)-4-(N-m-acetamidobenzyl-β-carboxamidoethyl)homopiperazine,
1-(p-chlorobenzhydryl)-4-(N-p-phenylbenzyl-β-carboxamidoethyl)homopiperazine,
1-(p-chlorobenzhydryl)-4-(N-o-phenoxybenzyl-β-carboxamidoethyl)homopiperazine,
1-(p-chlorobenzhydryl)-4-(N-p-nitrobenzyl-β-carboxamidoethyl)homopiperazine,
1-(p-chlorobenzhydryl)-4-(N-m,p-methylenedioxybenzyl-β-carboxamidoethyl)homopiperazine,
1-(p-chlorobenzhydryl)-4-(N-3'-pyridyl-β-carboxamidoethyl)homopiperazine,
1-(p-chlorobenzhydryl)-4-(N-2'-thiazolyl-β-carboxamidoethyl)homopiperazine, and
1-(p-chlorobenzhydryl)-4-(N-2'-oxazolyl-β-carboxamidoethyl)homopiperazine, respectively, which are isolated in the form of the free bases, converted to their solid, crystalline dimaleates by treatment in a minimum of isopropyl alcohol with two equivalents of maleic acid and found to be effective, nontoxic antiallergic, antihistaminic and antiserotonin agents in animals upon oral administration.

EXAMPLE 15

Substitution in the procedure of Example 1 for the 1-(p-chlorobenzhydryl)piperazine used therein of 0.04 mole of 1-(o-bromobenzhydryl)homopiperazine,
1-(m-iodobenzhydryl)homopiperazine,
1-(p-fluorobenzhydryl)homopiperazine,
1-(o-chlorobenzhydryl)homopiperazine,
1-(o-trifluoromethylbenzhydryl)homopiperazine,
1-(p-methylbenzhydryl)homopiperazine,
1-(p-methoxybenzhydryl)homopiperazine,
1-(m-methylthiobenzhydryl)homopiperazine,
1-(o-acetamidobenzhydryl)homopiperazine,
1-(p-phenylbenzhydryl)homopiperazine,
1-(o-phenoxybenzhydryl)homopiperazine,
1-(m-nitrobenzhydryl)homopiperazine,
1-(m,p-methylenedioxybenzhydryl)homopiperazine,
1-(m-chlorobenzhydryl)homopiperazine,
1-(p-trifluoromethylbenzhydryl)homopiperazine,
1-(o,p-dichlorobenzhydryl)homopiperazine,
1-(m,p-dimethoxybenzhydryl)homopiperazine,
1-[α-(1′-naphthyl)p-chlorobenzyl]homopiperazine,
1-[α-(cyclopropyl)p-chlorobenzyl]homopiperazine,
1-[α-(cyclohexyl)p-chlorobenzyl]homopiperazine,
1-[α-(cycloheptyl)p-chlorobenzyl]homopiperazine,
1-[α-(1′-cyclopentenyl)p-chlorobenzyl]homopiperazine,
1-[α-(1′-cyclohexenyl)p-chlorobenzyl]homopiperazine,
1-[α-(1′-cycloheptenyl)p-chlorobenzyl]homopiperazine,
1-[α-(2′-thienyl)p-chlorobenzyl]homopiperazine, and
1-[α-(2′-pyridyl)p-chlorobenzyl]homopiperazine, respectively, produces 1-(o-bromobenzhydryl)-4-(N-benzyl-β-carboxamidoethyl)homopiperazine,
1-(m-iodobenzhydryl)-4-(N-benzyl-β-carboxamidoethyl)homopiperazine,
1-(p-fluorobenzhydryl)-4-(N-benzyl-β-carboxamidoethyl)homopiperazine,
1-(o-chlorobenzhydryl)-4-(N-benzyl-β-carboxamidoethyl)homopiperazine,
1-(o-trifluoromethyl)-4-(N-benzyl-β-carboxamidoethyl)homopiperazine,
1-(p-methylbenzhydryl)-4-(N-benzyl-β-carboxamidoethyl)homopiperazine,
1-(p-methoxybenzhydryl)-4-(N-benzyl-β-carboxamidoethyl)homopiperazine,
1-(m-methylthiobenzhydryl)-4-(N-benzyl-β-carboxamidoethyl)homopiperazine,
1-(o-acetamidobenzhydryl)-4-(N-benzyl-β-carboxamidoethyl)homopiperazine,
1-(p-phenylbenzhydryl)-4-(N-benzyl-β-carboxamidoethyl)homopiperazine,
1-(o-phenoxybenzhydryl)-4-(N-benzyl-β-carboxamidoethyl)homopiperazine,
1-(m-nitrobenzhydryl)-4-(N-benzyl-β-carboxamidoethyl)homopiperazine,
1-(m,p-methylenedioxybenzhydryl)-4-(N-benzyl-β-carboxamidoethyl)homopiperazine,
1-(m-chlorobenzhydryl)-4-(N-benzyl-β-carboxamidoethyl)homopiperazine,
1-(p-trifluoromethylbenzhydryl)-4-(N-benzyl-β-carboxamidoethyl)homopiperazine,
1-(o,p-dichlorobenzhydryl)-4-(N-benzyl-β-carboxamidoethyl)homopiperazine,
1-(m,p-dimethoxybenzhydryl)-4-(N-benzyl-β-carboxamidoethyl)homopiperazine,
1-[α-(1′-naphthyl)-p-chlorobenzyl]-4-(N-benzyl-β-carboxamidoethyl)homopiperazine,
1-[α-(cyclopropyl)-p-chlorobenzyl]-4-(N-benzyl-β-carboxamidoethyl)homopiperazine,
1-[α-(cyclohexyl)-p-chlorobenzyl]-4-(N-benzyl-β-carboxamidoethyl)homopiperazine,
1-[α-(cycloheptyl)-p-chlorobenzyl]-4-(N-benzyl-β-carboxamidoethyl)homopiperazine,
1-[α-(1′-cyclopentenyl)-p-chlorobenzyl]-4-(N-benzyl-β-carboxamidoethyl)homopiperazine,
1-[α-(1′-cyclohexenyl)-p-chlorobenzyl]-4-(N-benzyl-β-carboxamidoethyl)homopiperazine,
1-[α-(1′-cycloheptenyl)-p-chlorobenzyl]-4-(N-benzyl-β-carboxamidoethyl)homopiperazine,
1-[α-(2′-thienyl)-p-chlorobenzyl]-4-(N-benzyl-β-carboxamidoethyl)homopiperazine, and
1-[α-(2′-pyridyl)-p-chlorobenzyl]-4-(N-benzyl-β-carboxamidoethyl)homopiperazine, respectively, which are isolated in the form of the free bases, converted to their solid, crystalline dimaleates by treatment in a minimum of isopropyl alcohol with two equivalents of maleic acid and found to be effective nontoxic antiallergic, antihistaminic and antiserotonin agents in animals upon oral administration.

EXAMPLE 16

Substitution in the procedure of Example 1 for the 1-(p-chlorobenzhydryl)piperazine used therein of 0.04 mole of 1-[α-(1′-naphthyl)-o-bromobenzyl]piperazine,
1-[α-(cyclopropyl)-m-iodobenzyl]piperazine,
1-[α-(cyclohexyl)-p-fluorobenzyl]piperazine,
1-[α-(cycloheptyl)-o-chlorobenzyl]piperazine,
1-[α-(1′-cyclopentenyl)-o-trifluoromethylbenzyl]piperazine,
1-[α-(1′-cyclohexenyl)-p-methylbenzyl]piperazine,
1-[α-(1′-cycloheptenyl)-p-methoxybenzyl]piperazine,
1-[α-(2′-thienyl)-m-methylthiobenzyl]piperazine,
1-[α-(2′-pyridyl)-o-acetamidobenzyl]piperazine,
1-[α-(1′-naphthyl)-p-phenylbenzyl]piperazine,
1-[α-(cyclopropyl)-o-phenoxybenzyl]piperazine,
1-[α-(cyclohexyl)-m-nitrobenzyl]piperazine,
1-[α-(cycloheptyl)-m,p-methylenedioxyl]piperazine,
1-[α-(1′-cyclopentyl)-m-chlorobenzyl]piperazine,
1-[α-(1′-cyclohexenyl)-p-trifluoromethylbenzyl]piperazine,
1-[α-(1′-cycloheptenyl)-o,p-dichlorobenzyl]piperazine,
1-[α-(2′-thienyl)-m,p-dimethoxybenzyl]piperazine,
1-[α-(2′-pyridyl)-p-trifluoromethylbenzyl]piperazine,
1-[α-2′-thienyl)-p-trifluoromethylbenzyl]piperazine,
1-[α-2′-pyridyl)-p-trifluoromethylbenzyl]piperazine,
1-[α-(3′-thienyl)-p-chlorobenzyl]piperazine,
1-[α-(cyclopentyl)-p-trifluoromethylbenzyl]piperazine and
1-[α-(cyclopentyl)-p-chlorobenzyl]piperazine,
respectively, produces
1-[α-(1′-naphthyl)-o-bromobenzyl]-4-(N-benzyl-β-carboxamidoethyl)piperazine,
1-[α-cycloproply)-m-iodobenzyl]-4-(N-benzyl-β-carboxamidoethyl)piperazine,
1-[α-(cyclohexyl)-p-fluorobenzyl]-4-(N-benzyl-β-carboxamidoethyl)piperazine,
1-[α-(cycloheptyl)-chlorobenzyl]-4-(N-benzyl-β-carboxamidoethyl)piperazine,
1-[α-(1′-cyclopentenyl)-o-trifluoromethylbenzyl]-4-(N-benzyl-β-carboxamidoethyl)piperazine,
1-[α-(1′-cyclohexenyl)-p-methylbenzyl]-4-(N-benzyl-β-carboxamidoethyl)piperazine,
1-[α-(1′-cycloheptenyl)-p-methoxybenzyl]-4-(N-benzyl-β-carboxamidoethyl)piperazine,
1-[α-(2′-thienyl)-m-methylthiobenzyl]-4-(N-benzyl-β-carboxamidoethyl)piperazine,
1-[α-2′-pyridyl)-o-acetamidobenzyl]-4-(N-benzyl-β-carboxamidoethyl)piperazine,
1-[α-(1′-naphthyl)-p-phenylbenzyl]-4-(N-benzyl-β-carboxamidoethyl)piperazine,
1-[α-(cyclopropyl)-o-phenoxybenzyl]-4-(N-benzyl-β-carboxamidoethyl)piperazine,
1-[α-(cyclohexyl-m-nitrobenzyl]-4-(N-benzyl-β-carboxamidoethyl)piperazine, 1-[α-(cycloheptyl)-m,p-methylenedioxybenzyl]-4-(N-(N-benzyl-β-carboxamidoethyl)piperazine,
1-[α-(1'-cyclopentenyl)-m-chorobenzyl]-4-(N-benzyl-β-carboxamidoethyl)piperazine,
1-[α-(1'-cyclohexenyl)-p-trifluoromethylbenzyl]-4-(N-benzyl-β-carboxamidoethyl)piperazine,
1-[α-(1'cycloheptenyl)-o,p-dichlorobenzyl]-4-(N-benzyl-β-carboxamidoethyl)piperazine,
1-[α-(2'-thienyl)-m,p-dimethoxybenzyl]-4-(N-benzyl-β-carboxamidoethyl)piperazine,
1-[α-(2'-pyridyl)-p-trifluoromethylbenzyl]-4-(N-benzyl-β-carboxamidoethyl)piperazine,
1-[α-(2'-thienyl)-p-trifluoromethylbenzyl]-4-(N-benzyl-β-carboxamidoethyl)piperazine,
1-[α-3'-thienyl)-p-trifluoromethylbenzyl]-4-(N-benzyl-β-carboxamidoethyl)piperazine,
1-[α-(3'-thienyl)-p-chlorobenzyl]-4-(N-benzyl-β-carboxamidoethyl)piperazine,
1-[α-(cyclopentyl)-p-trifluoromethylbenzyl]-4-(N-benzyl-β-carboxamidoethyl)piperazine and
1-[α-(cyclopentyl)-p-chlorobenzyl]-4-(N-benzyl-β-carboxamidoethyl)piperazine, respectively, which are isolated in the form of the free bases, converted to their solid, crystalline dimaleates by treatment in a minimum of isopropyl alcohol with two equivalents of maleic acid and found to be effective, nontoxic antiallergic, antihistaminic and antiserotonin agents in animals upon oral administration.

EXAMPLE 17

Substitution in the procedure of Example 1 for the 1-(p-chlorobenzhydryl)piperazine used therein of 0.04 mole of
1-[α-(1'-naphthyl)-o-bromobenzyl]homopiperazine,
1-[α-(cyclopropyl)-m-iodobenzyl]-homopiperazine,
1-[α-(cyclohexyl)-p-fluorobenzyl]homopiperazine,
1-[α-(cycloheptyl)-o-chlorobenzyl]homopiperazine,
1-[α-(1'-cyclopentenyl)-o-trifluoromethylbenzyl]-homopiperazine,
1-[α-(1'-cyclohexenyl)-p-methylbenzyl]homopiperazine,
1-[α-(1'-cycloheptenyl)-p-methoxybenzyl]-homopiperazine,
1-[α-(2'-thienyl)-m-methylthiobenzyl]homopiperazine,
1-[α-(2'-pyridyl)-o-acetamidobenzyl]homopiperazine,
1-[α-(1'-naphthyl)-p-phenylbenzyl]homopiperazine,
1-[α-(cyclopropyl)-o-phenoxybenzyl]homopiperazine,
1-[α-(cyclohexyl)-m-nitrobenzyl]homopiperazine,
1-[α-(cycloheptyl)-m,p-methylenedioxybenzyl]-homopiperazine,
1-[α-(1'-cyclopentenyl)-m-chlorobenzyl]homopiperazine,
1-[α-(1'-cyclohexenyl)-p-trifluoromethylbenzyl]homopiperazine,
1-[α-(1'-cycloheptenyl)-o,p-dichlorobenzyl]-homopiperazine,
1-[α-(2'-thienyl)-m,p-dimethoxybenzyl]homopiperazine,
1-[α-(2'-pyridyl)-p-trifluoromethylbenzyl]-homopiperazine,
1-[α-(2'-thienyl)-p-trifluoromethylbenzyl]-homopiperazine,
1-[α-(3'-thienyl)-p-trifluoromethylbenzyl]-homopiperazine,
1-[α-(3'-thienyl)-p-chlorobenzyl]homopiperazine,
1-[α-(cyclopentyl)-p-trifluoromethylbenzyl]-homopiperazine and
1-[α-(cyclopentyl)-p-chlorobenzyl]homopiperazine, respectively, produces 1-[α-(1'-naphthyl)-o-bromobenzyl]-4-(N-benzyl-β-carboxamidoethyl)homopiperazine,
1-[α-(cyclopropyl)-m-iodobenzyl]-4-(N-benzyl-β-carboxamidoethyl)homopiperazine,
1-[α-(cyclohexyl)-p-fluorobenzyl]-4-(N-benzyl-β-carboxamidoethyl)homopiperazine,
1-[α-(cycloheptyl)-o-chlorobenzyl]-4-(N-benzyl-β-carboxamidoethyl)homopiperazine,
1-[α-(1'-cyclopentenyl)-o-trifluoromethylbenzyl]-4-(N-benzyl-β-carboxamidoethyl)homopiperazine,
1-[α-(1'-cyclohexenyl)-p-methylbenzyl]-4-(N-benzyl-β-carboxamidoethyl)homopiperazine,
1-[α-(1'-cycloheptenyl)-p-methoxybenzyl]-4-(N-benzyl-β-carboxamidoethyl)homopiperazine,
1-[α-(2'-thienyl)-m-methylthiobenzyl]-4-(N-benzyl-β-carboxamidoethyl)homopiperazine,
1-[α-(2'-pyridyl)-o-acetamidobenzyl]-4-(N-benzyl-β-carboxamidoethyl)homopiperazine,
1-[α-(1'-naphthyl)-p-phenylbenzyl]-4-(N-benzyl-β-carboxamidoethyl)homopiperazine,
1-[α-(cyclopropyl)-o-phenoxybenzyl]-4-(N-benzyl-β-carboxamidoethyl)homopiperazine,
1-[α-(cyclohexyl)-m-nitrobenzyl]-4-(N-benzyl-β-carboxamidoethyl)-homopiperazine,
1-[α-(cycloheptyl)-m,p-methylenedioxybenzyl]-4-(N-benzyl-β-carboxamidoethyl)homopiperazine,
1-[α-(1'-cyclopentenyl)-m-chlorobenzyl]-4-(N-benzyl-β-carboxamidoethyl)homopiperazine,
1-[α-(1'-cyclohexenyl)-p-trifluoromethylbenzyl]-4-(N-benzyl-β-carboxamidoethyl]homopiperazine,
1-[α-(1'-cycloheptenyl)-o,p-dichlorobenzyl]-4-(N-benzyl-β-carboxamidoethyl)homopiperazine,
1-[α-(2'-thienyl)-m,p-dimethoxybenzyl]-4-(N-benzyl-β-carboxamidoethyl)homopiperazine,
1-[α-(2'-pyridyl)-p-trifluoromethylbenzyl]-4-(N-benzyl-β-carboxamidoethyl)homopiperazine,
1-[α-(2'-thienyl)-p-trifluoromethylbenzyl]-4-(N-benzyl-β-carboxamidoethyl)homopiperazine,
1-[α-(3'-thienyl)-p-trifluoromethylbenzyl]-4-(N-benzyl-β-carboxamidoethyl)homopiperazine,
1-[α-(3'-thienyl)-p-chlorobenzyl]-4-(N-benzyl-β-carboxamidoethyl)homopiperazine,
1-[α-(cyclopentyl)-p-trifluoromethylbenzyl]-4-(N-benzyl-β-carboxamidoethyl)homopiperazine, and
1-[α-(cyclopentyl)-p-chlorobenzyl]-4-(N-benzyl-β-carboxamidoethyl)homopiperazine, respectively, which are isolated in the form of the free bases, converted to their solid, crystalline dimaleates by treatment in a minimum of isopropyl alcohol with two equivalents of maleic acid and found to be effective, nontoxic antiallergic, antihistaminic and antiserotonin agents in animals upon oral administration.

EXAMPLE 18

*1-(p-chlorobenzhydryl)-4-(N-propargyl-β-carboxamidoethyl)piperazine*

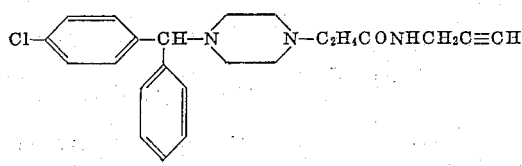

A mixture of 1-(p-chlorobenzhydryl)piperazine (13 g., 0.045 M), N-propargyl β-chloropropionamide (6.6 g., 0.045 M), triethylamine (6.5 ml., 0.045 M) and dimethyl formamide (25 ml.) was heated to 70° for four hours. The reaction mixture, when cool, was poured into dilute sodium hydroxide solution. An oil separated which did not crystallize. The aqueous portion was decanted and the base dissolved in methylene chloride and converted directly to the acid addition salt.

EXAMPLE 19

*1-(p-chlorobenzhydryl)-4-(N-propargyl-β-carboxamidoethyl)piperazine dimaleate*

The base of Example 18 was treated with maleic acid dissolved in iospropanol. After recrystallization of the salt from isopropanol it melted at 149–151° C.

I claim:
1. A member selected from the group consisting of compounds of the formula

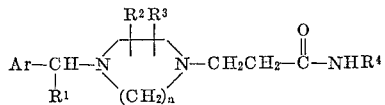

wherein Ar— represents

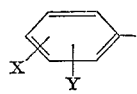

in which X and Y each represent a member selected from the group consisting of hydrogen, chloro, bromo, fluoro, iodo, trifluoromethyl, (lower)alkyl, (lower)alkoxy, (lower)alkylthio, (lower)alkanoylamino, phenyl, phenoxy, nitro and, when taken together, methylenedioxy, $R^1$ is a member selected from the group consisting of phenyl, naphthyl, cycloalkyl containing from three to seven carbon atoms, inclusive, cycloalkenyl containing from five to seven carbon atoms inclusive, thienyl and pyridyl, $R^2$ and $R^3$ are each a member selected from the group consisting of hydrogen and methyl, $n$ is an integer from two to three inclusive and $R^4$ is a member selected from the group consisting of naphthyl, thienyl, pyridyl, oxazolyl, thiazolyl, propargyl, 2-phenylcyclopropyl, —Ar and -alk—Ar in which alk represents a bivalent saturated alkylene group containing from one to three carbon atoms inclusive; and nontoxic, pharmaceutically acceptable salts thereof.

2. A compound of the formula

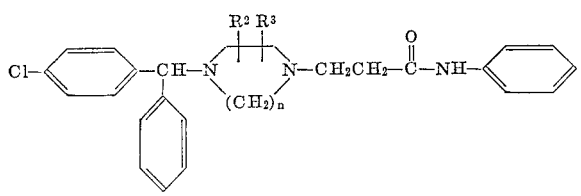

wherein $R^2$ and $R^3$ are each members selected from the group consisting of hydrogen and methyl and $n$ is an integer from 2 to 3 inclusive.

3. A compound of the formula

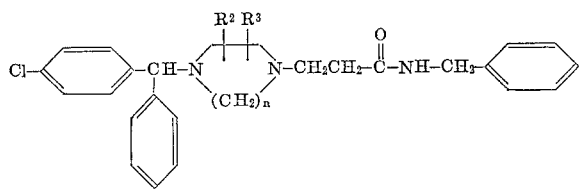

wherein $R^2$ and $R^3$ are each members selected from the group consisting of hydrogen and methyl and $n$ is an integer from 2 to 3 inclusive.

4. A compound of the formula

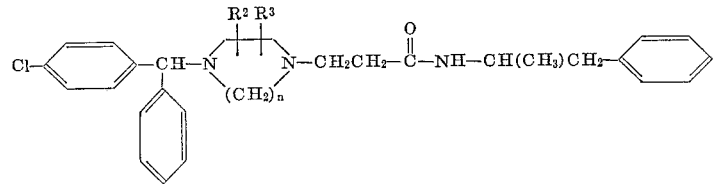

wherein $R^2$ and $R^3$ are each members selected from the group consisting of hydrogen and methyl and $n$ is an integer from 2 to 3 inclusive.

5. A compound of the formula

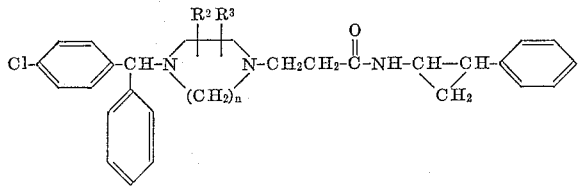

wherein $R^2$ and $R^3$ are each members selected from the group consisting of hydrogen and methyl and $n$ is an integer from 2 to 3 inclusive.

6. The compound of the formula

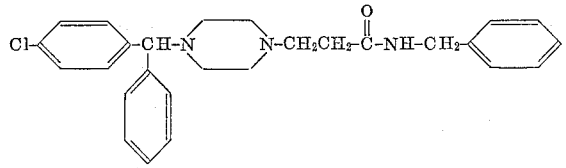

7. A nontoxic, pharmaceutically acceptable acid addition salt of the compound of claim 6.

8. The compound of the formula

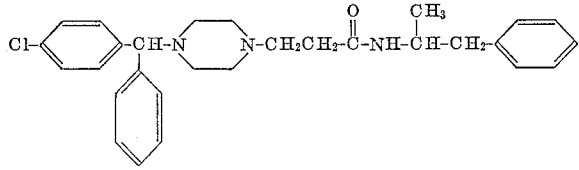

9. A nontoxic, pharmaceutically acceptable acid addition salt of the compound of claim 8.

10. The compound of the formula

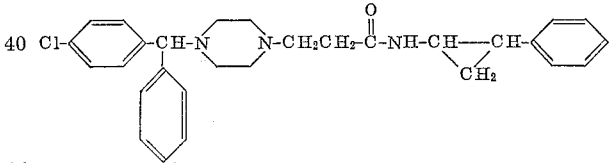

11. A nontoxic, pharmaceutically acceptable acid addition salt of the compound of claim 10.

12. The compound of the formula

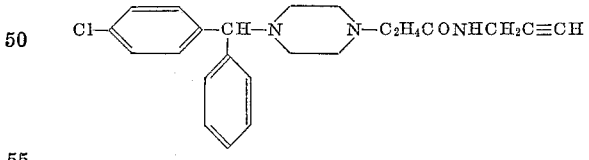

13. A nontoxic, pharmaceutically acceptable acid addition salt of the compound of claim 12.

No references cited.

HENRY R. JILES, *Primary Examiner.*